United States Patent
Joseph et al.

(10) Patent No.: US 12,124,490 B2
(45) Date of Patent: Oct. 22, 2024

(54) PREDICTING POLICY VIOLATIONS IN A DOCUMENT WITH AN ENTERPRISE DATA SOURCE

(71) Applicant: International Business Machines Corporation, Armonk, NY (US)

(72) Inventors: Jojo Joseph, Bengaluru (IN); Sathis R Marudanayagam, Bengaluru (IN); Paul Baby, Bangalore (IN); Afizullah Shaik, Yerraguntla (IN)

(73) Assignee: International Busi ness Machines Corporation, Armonk, NY (US)

( * ) Notice: Subject to any disclaimer, the term of this patent is extended or adjusted under 35 U.S.C. 154(b) by 350 days.

(21) Appl. No.: 17/451,832

(22) Filed: Oct. 22, 2021

(65) Prior Publication Data
US 2023/0128589 A1 Apr. 27, 2023

(51) Int. Cl.
G06F 16/35 (2019.01)
G06F 16/33 (2019.01)
G06F 16/383 (2019.01)
G06F 40/166 (2020.01)
G06Q 30/018 (2023.01)

(52) U.S. Cl.
CPC .......... *G06F 16/35* (2019.01); *G06F 16/3335* (2019.01); *G06F 16/383* (2019.01); *G06F 40/166* (2020.01); *G06Q 30/018* (2013.01)

(58) Field of Classification Search
None
See application file for complete search history.

(56) References Cited

U.S. PATENT DOCUMENTS

| | | | |
|---|---|---|---|
| 7,886,359 B2 * | 2/2011 | Jones | G06F 16/334 707/758 |
| 7,996,373 B1 * | 8/2011 | Zoppas | G06F 21/556 707/694 |
| 8,065,739 B1 | 11/2011 | Bruening | |

(Continued)

FOREIGN PATENT DOCUMENTS

| | | |
|---|---|---|
| CN | 116029544 A | 4/2023 |
| WO | 2017214608 A1 | 12/2017 |

OTHER PUBLICATIONS

Basescu et al., "Managing Data Access on Clouds: A Generic Framework for Enforcing Security Policies", The 25th International Conference on Advanced Information Networking and Applications (AINA-2011), Institute for Infocomm Research (I2R) in cooperation with the Singapore Chapter of ACM, Mar. 2011, Singapore, Singapore. pp. 459-466.

(Continued)

*Primary Examiner* — Jonathan C Kim
(74) *Attorney, Agent, or Firm* — Schmeiser, Olsen & Watts, LLP; Rakesh Roy

(57) ABSTRACT

Predicting potential policy violations in a given data source (such as a set of documents) so that a deeper analysis can be performed on the set of documents to gain additional insights into the potential policy violation(s) that may be contained therein. In some instances, this prediction is done by performing a random sampling operation on the set of documents and collecting the metadata from these documents in order to determine whether or not the set of documents that are randomly sampled include a policy violation that can be remediated.

18 Claims, 4 Drawing Sheets

(56) References Cited

U.S. PATENT DOCUMENTS

| | | | |
|---|---|---|---|
| 8,671,080 B1* | 3/2014 | Upadhyay | G06F 21/552 |
| | | | 707/821 |
| 8,677,132 B1* | 3/2014 | Liao | H04L 9/321 |
| | | | 713/176 |
| 9,183,384 B1 | 11/2015 | Bruhmuller | |
| 9,495,395 B2 | 11/2016 | Chan | |
| 10,114,846 B1* | 10/2018 | Shah | G06F 16/24537 |
| 10,140,383 B2* | 11/2018 | Cypher | G06F 16/9535 |
| 2017/0103101 A1* | 4/2017 | Mason | G06F 16/2365 |
| 2018/0052832 A1* | 2/2018 | Anglin | G06F 40/58 |
| 2018/0075138 A1* | 3/2018 | Perram | G06F 16/93 |
| 2018/0173735 A1* | 6/2018 | Foley | G06F 16/285 |
| 2018/0239826 A1* | 8/2018 | Epstein | G06F 3/0482 |
| 2018/0367423 A1* | 12/2018 | Tan | G06F 16/2465 |
| 2020/0067988 A1 | 2/2020 | Foley | |
| 2020/0159947 A1 | 5/2020 | Shenefiel | |
| 2020/0177637 A1 | 6/2020 | Narayanaswamy | |
| 2020/0250345 A1* | 8/2020 | Bässler | G06F 16/93 |
| 2020/0293718 A1* | 9/2020 | Boudreau | G06F 40/30 |
| 2020/0320224 A1* | 10/2020 | Regensburger | G06F 17/18 |
| 2020/0379962 A1* | 12/2020 | Yamato | G08C 15/00 |
| 2020/0394361 A1* | 12/2020 | Parikh | G06F 40/274 |
| 2021/0004417 A1* | 1/2021 | Baessler | G06F 16/951 |
| 2023/0128589 A1* | 4/2023 | Joseph | G06F 40/216 |
| | | | 704/9 |
| 2023/0130206 A1* | 4/2023 | Joseph | G06F 21/6281 |
| | | | 726/26 |

OTHER PUBLICATIONS

BigID, "Introducing Hyperscan: Find Sensitive Data 95% Faster", Feb. 27, 2021, 5 pages, https://bigid.com/blog/hyperscan/.

Disclosed Anonymously, "System and method for risk based document harvesting", An IP.com Prior Art Database Technical Disclosure, IP.com No. IPCOM000264444D, IP.com Electronic Publication Date: Dec. 18, 2020, 3 pages.

IBM, "Checking compliance", IBM Watson Knowledge Catalog InstaScan for Cloud Pak for Data, Feb. 27, 2021, 4 pages.

IBM, "IBM Watson Knowledge Catalog InstaScan", Data and AL Solution Brief, 2020, 10 pages.

Manda, "Unlock IT cost savings with IBM Cloud Pak for Data", Aug. 27, 2020, 6 pages.

* cited by examiner

PREDICTING POLICY VIOLATIONS IN A DOCUMENT WITH AN ENTERPRISE DATA SOURCE

BACKGROUND

The present invention generally relates to the field of regulatory compliance, and more particularly to the use of enterprise related solutions to ensure that large enterprises comply with the applicable regulations.

The Wikipedia entry for "Metadata" (as of Aug. 23, 2021) states as follows: "Metadata is 'data that provides information about other data' . . . . Many distinct types of metadata exist, including descriptive metadata, structural metadata, administrative metadata, reference metadata, statistical metadata, and legal metadata."

The Wikipedia entry for "Heuristic (computer science)" (as of Aug. 23, 2021) states as follows: "In . . . computer science, heuristic . . . is a technique designed for solving a problem more quickly when classic methods are too slow, or for finding an approximate solution when classic methods fail to find any exact solution. This is achieved by trading optimality, completeness, accuracy, or precision for speed. In a way, it can be considered a shortcut. A heuristic function, also simply called a heuristic, is a function that ranks alternatives in search algorithms at each branching step based on available information to decide which branch to follow."

SUMMARY

According to an aspect of the present invention, there is a method, computer program product and/or system that performs the following operations (not necessarily in the following order): (i) receiving a plurality of documents, with the plurality of documents including substantive content data and metadata; (ii) initializing a plurality of random buckets to perform a random sampling operation; (iii) computing a metadata sample size from the plurality of initialized random buckets, with the metadata sample size being a number of documents from which the metadata is to be collected based, at least in part, upon a predetermined confidence level and error rate; (iv) collecting metadata from the plurality of documents until the collected metadata equals the computed metadata sample size; and (v) responsive to the collection of the metadata, analyzing a first subset of the plurality of documents to determine whether the first subset of the plurality of documents includes a policy violation; (vi) determining if an area within the data source or a type of document(s) is likely to contain more policy violations compared to other areas or document type(s) within the data source.

According to an aspect of the present invention, there is a method, computer program product and/or system that performs the following operations (not necessarily in the following order): (i) receiving a plurality of documents, with the plurality of documents including substantive content data and metadata; (ii) receiving a metadata catalog, with the metadata catalog including information indicative of a policy compliance score for a plurality of documents; (iii) running, by metadata scan module, a metadata scan of the plurality of documents; (iv) responsive to the running of metadata scan, determining a plurality of metadata scores for the plurality of documents; (v) comparing the plurality of metadata scores for the plurality of documents against the policy compliance scores for the plurality of documents included in the metadata catalog; and (vi) determining whether any of the plurality of documents includes a policy violation based, at least in part, upon the comparison of the plurality of metadata scores against the policy compliance scores; (vii) predicting if a document has potential policy violations by looking only at the metadata attributes.

DETAILED DESCRIPTION

Figure 1:
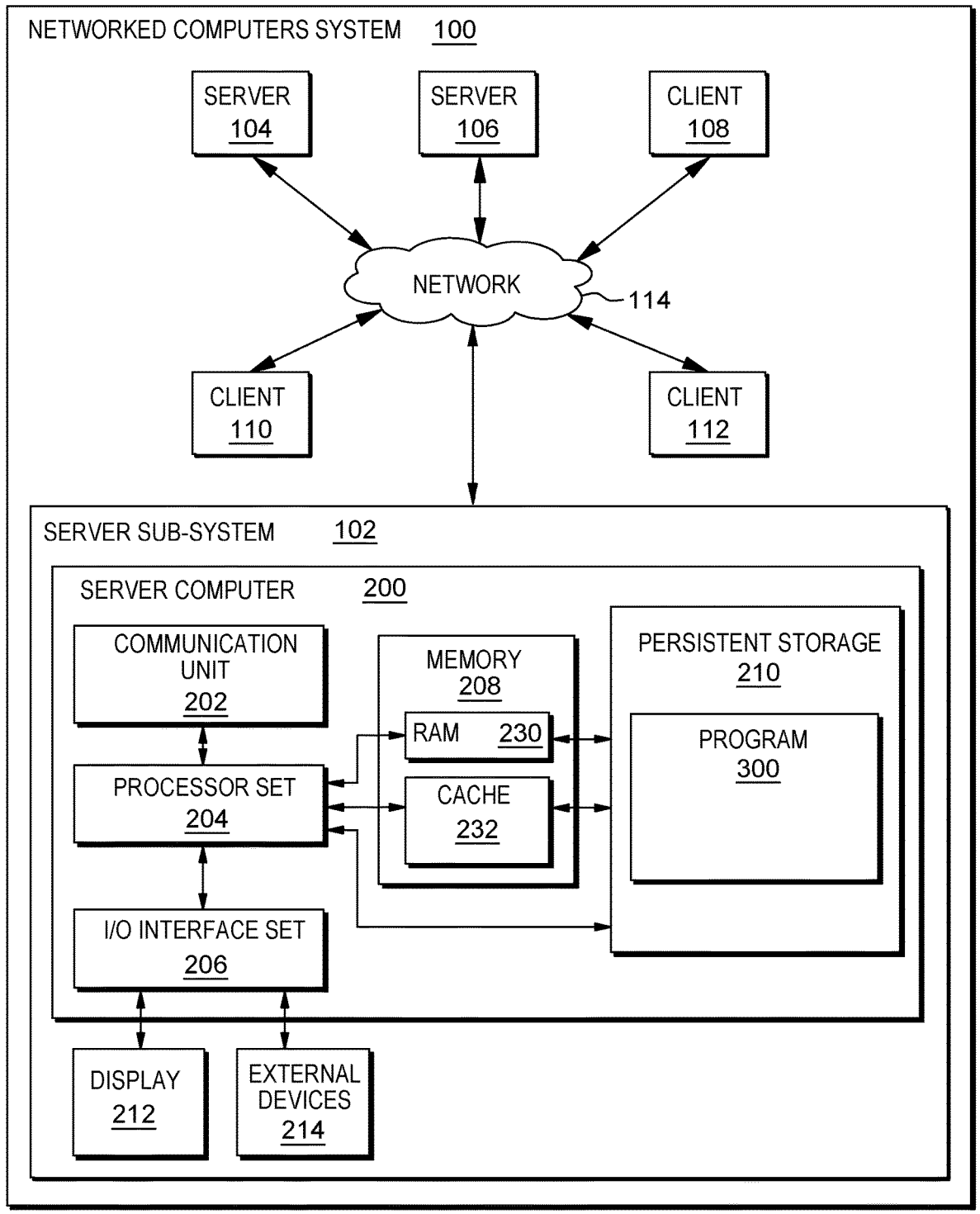
FIG. 1 is a block diagram view of a first embodiment of a system according to the present invention.

Some embodiments of the present invention are directed towards predicting potential policy violations in a given data source (such as a set of documents) so that a deeper analysis can be performed on the set of documents to gain additional insights into the potential policy violation(s) that may be contained therein. In some instances, this prediction is done by performing a random sampling operation on the set of documents and collecting the metadata from these documents in order to determine whether or not the set of documents that are randomly sampled include a policy violation that can be remediated.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
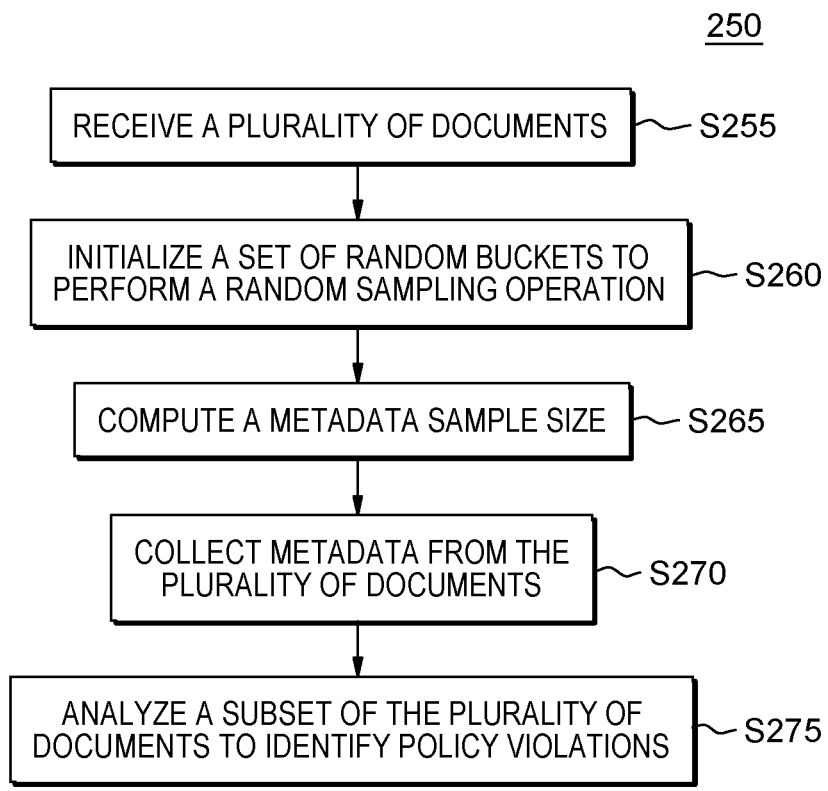
FIG. 2 is a flowchart showing a first embodiment method performed, at least in part, by the first embodiment system.
Figure 3:
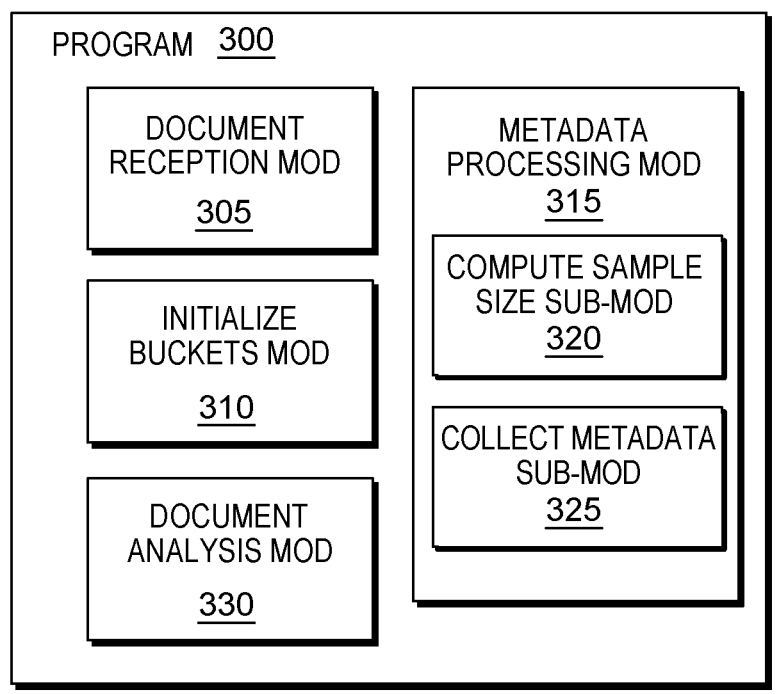
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at S255, where document reception module ("mod") 305 receives a set of documents. These documents typically contain policy information, procedural information, and/or represent data that is collected and used by large enterprises.

Processing proceeds to operation S260, where initialize buckets mod 310 initializes a set of random buckets. In some embodiments of the present invention, these initialized set of random buckets are used to perform random sampling operations on the set of documents received (discussed in connection with operation S255, above). The random sampling operations are discussed in greater detail in Sub-Section III, below.

Processing proceeds to operation S265, where compute sample size sub-module ("sub-mod") 320 of metadata processing mod 315 computes a metadata sample size. In some embodiments of the present invention, the metadata sample size is a statistically valid sample of metadata that is to be collected in order to determine that a potential policy violation is found in a given set of documents with a high degree of confidence. In some embodiments, the metadata sample size is set by a data steward (as discussed in greater detail in Sub-Section III, below). Alternatively, the metadata sample size can be computed based on a correlation between the amount of documents that need to be scanned for policy violations (as discussed in greater detail in Sub-Section III, below).

Processing proceeds to operation S270, where collect metadata sub-mod 325 of metadata processing mod 315 collects the metadata from the plurality of documents that are received (discussed in connection with operation S255, above). In some embodiments of the present invention, collect metadata sub-mod 325 collects metadata for only a subset of the plurality of documents that are received. In some embodiments, once an initial set of metadata is collected, sub-mod 325 continues to incrementally collect metadata for the documents whose metadata is yet to be collected. By doing so, collect metadata sub-mod 325 ensures that the amount of metadata collected is: (i) equal to the computed metadata sample size; and (ii) a statistically valid sample of metadata on which to perform random sampling operations.

Finally, processing proceeds to operation S275, where document analysis mod 330 analyzes a subset of the plurality of documents received (discussed above in connection with operation S255, above). Additionally, the analysis of the plurality of documents is discussed in greater detail in Sub-Section III, below.

III. Further Comments and/or Embodiments

Some embodiments of the present invention recognize the following facts, potential problems and/or potential areas for improvement with respect to the current state of the art: (i) large enterprises that operate in highly regulated environments need to run compliance projects in order to certify that they are compliant to the rules and regulations issued by a given government entity and/or corporate governance polices created by the organization; (ii) some regulations like GDPR and CCPA are potentially applicable irrespective of the industry that an enterprise operates in; (iii) other regulations such as HIPAA are applicable only to certain industries; (iv) creating governance policies, adhering to these policies and auditing the adherence on a continuous basis is important for enterprises; and (v) certain proprietary products offer ways to help customers in all these aspects.

Some embodiments of the present invention recognize the following facts, potential problems and/or potential areas for improvement with respect to the current state of the art: (i) some proprietary products helps customers to make sure that unstructured cloud data sources are compliant with such governance policies; (ii) applying governance policies to unstructured data sources are orders of magnitude more difficult compared to their structured counterparts; and (iii) this is due to the volume, variety, velocity and veracity of unstructured data sources. As an example, let us consider a policy that says "no personal sensitive information can be stored on Company A's Enterprise Cloud account". In this case, a street address of an employee, a phone number, an email address, medical history, political opinion or trade union membership could be treated as personal sensitive information. Consequently, the organization is required to identify any instances of policy violation(s) and remediate the violation(s).

Some embodiments of the present invention recognize the following facts, potential problems and/or potential areas for improvement with respect to the current state of the art: (i) one previous solution was to analyse every single document on a cloud data source to identify any policy violation; (ii) however this is practically impossible in almost all situations; (iii) take, for example, the Cloud account operated by Company A with several millions of documents; (iv) each document would need to be pulled down, and the text contents would need to be extracted and analysed against each policy rule for detecting any violation; (v) this would take several months or even years of CPU time and millions of API calls over the network; and (vi) this process makes it impractical to achieve regulatory compliance with respect to documents in the cloud data sources at a reasonable cost.

Some embodiments of the present invention recognize the following facts, potential problems and/or potential areas for improvement with respect to the current state of the art: (i) it is clear that the approach taken for structured data cannot be applied to unstructured data sources; (ii) certain scan software currently offers innovative ways of solving this; (iii) one technique includes enforcing policies with a given confidence level and acceptable margin of error by analyzing a true random sample from the whole corpus of documents; (iv) for example, a CISO can state that 99% of the documents do not currently have any policy violations, with a confidence level of 99.9% and acceptable error rate of 0.5%, thereby reducing the risk of a data breach to a large extent; and (v) it is a goal to reach the highest confidence level and lowest possible margin of error.

Some embodiments of the present invention may include one, or more, of the following features, characteristics and/or advantages: (i) uses only metadata associated with the document; (ii) requires considerably less computing resources which leads to lower operating costs; (iii) predicts the policy violations in a document so that a deeper analysis can be performed to gain more insights on the policy violation; (iv) this is achieved by running a metadata scan of a given document and scoring this scan against a metadata catalogue; and (v) helps a customer to predict a potential violations in the document and thereby perform the appropriate actions.

Embodiments of the present invention provide for a method to identify policy violation hotspots so that data stewards can focus on remediating these hotspots. This is achieved by running a compliance project across the enterprise. As part of compliance projects, users typically analyze structured and unstructured data sources using statistical sampling. This methodology will help users identify the extent of violations within each data source, which is represented as a heat map.

In some embodiments of the present invention, the goal is to identify as many documents with policy violations as possible without analysing the substantive and/or metadata related content of all of the documents. Practically speaking, this means that organizations want to achieve compliance without incurring unreasonably high costs of analysing the entire contents from a variety of unstructured data sources (such as email servers, collaboration services, sync and share services, ECM file repositories, intranet servers, FTP servers, file servers, etc.).

This is important because of the following facts about unstructured data: (i) the amount of unstructured data an organization already has (currently, IDC estimates that 80 to 85 percent of the whole data generated by an enterprise is unstructured in nature); (ii) the rate at which new data is getting generated; (iii) the variety of unstructured documents including emails, office documents, other collaboration and communication content, pay slips, HR documents, contracts, etc.; (iv) the accuracy at which these documents can be evaluated for policy violations (veracity). Several policies typically require the ability to detect sensitive information such as political affiliation, trade union membership, health or medical data, sexual orientation, etc. in unstructured content; and (v) multiple languages in which unstructured data is generated.

It is quite common for multinational companies to have documents in multiple languages including Mandarin, Cantonese, Japanese, French, German, etc., in addition to English. Also, for companies that are operating in the European Union, it is common to have content distributed across the English, French, German, Spanish and Italian languages as well as a multitude of other languages.

Given the above facts, enterprise product users such as compliance officers and data stewards would greatly benefit if companies (as part of their data governance suite of products) provide a capability to achieve compliance without incurring heavy costs. This means avoid analysing the entire contents of the documents, but analysing only those documents where there is a high probability of finding a policy violation. This requires predicting whether a document contains a potential policy violation without analysing the substantive and/or metadata contents of the document.

In this case, the challenge is that there is no simple way to predict whether a document has potential violation just by its metadata. Here, embodiments of the present invention provide an algorithm that will help customers predict whether a document contains a potential violation just by analysing the metadata associated with the document.

Some embodiments of the present invention provide a novel system and method to predict whether a document has a potential policy violation based on the results in the catalogue. The method is described in greater detail below.

In one embodiment, two types of input metadata is required for this method. This includes basic metadata and enriched metadata (described in greater detail below).

With respect to basic metadata:

Basic metadata stored in the data source catalogue that includes the document name, location within the data source, owner, creation time stamp, size, access control list, people in the to: list, cc: list, bcc: list (only for emails), list of participants in a collaboration document, etc.

With respect to enriched metadata:

Enriched metadata includes the organization and/or department to which the owner belongs, first set of words from the text of the document (for example, 200 words), most frequent set of words excluding stop words in the document (for example, 20 words), data classes found in the document, sensitivity score, policy violations found, and frequency of violations.

Some embodiments of the present invention provides for a method, with the method including the following operations (not necessarily in the following order):

(i) create a connection to the data source providing the required credentials. It is sometimes optional to specify a required confidence level and margin of error at which this data source need to be analysed. If not provided then defaults like 99.5% confidence level and 1% margin of error will be assumed;

(ii) assign required sensitive data placement policies to the data sources. This is a prerequisite for running analysis;

(iii) connect to the data source and initialize basic details like total number of documents, total volume, time line (time stamp of first and last document) etc.;

(iv) initialize the set of random buckets of the timeline that are required for true random sampling. The width of the buckets will be varied so that each bucket will provide a similar number of documents. Embodiments of the present invention prove that these buckets can provide true random sampling with the required confidence level and margin of error;

(v) Metadata crawl (this will collect the basic metadata):

(a) compute the sample size for which metadata is to be collected. Ideally we should collect metadata for the whole corpus, but that is not practical when the data source is large. So we will collect the metadata only for what is required to achieve the required statistical confidence level and error rate. Data stewards can specify these limits while creating the connection. This sample size can be computed with a standard formula from the confidence level and error rate, and (b) collect the metadata for random documents until we reach the above sample size;

(vi) Metadata enrichment (this will collect enriched metadata):

(a) Select a subset of the samples collected (in the metadata crawl, discussed above), (b) for each document: get the content of the documents, run it through the analysis engine, this will detect the language, extract the text and run deep analysis on the content to identify any policy violation, add the policy violations to the document metadata, add the data classes found in the document to the metadata, compute the sensitivity score (a linear combination of the policy violations found and the weights associated with those violations) and add it to the metadata, and (c) Compute the confidence level and error rate. If this score is below the required level, then collect more of the samples collected in operation (v). If this score is above the required level, then the process is complete;

(vii) data Steward reviews the policy violations and flag any false positives so that these will be avoided in the subsequent computations;

(viii) construct a model for predicting the probability of finding a violation within a document using the basic metadata attributes as the feature vector. We can also use combinations of the basic metadata attributes to improve accuracy;

(ix) periodically search for list of documents added to the data source after the last run; and (x) for each new document added to the data source: (a) retrieve the base metadata attribute of the document, (b) pass these attributes to the prediction model and compute the probability of finding a violation, (c) based on the probability computed, the system can take various actions on the document such as notifying a data steward or doing a deep analysis of the content of the document, and (d) after deep analysis, if any policy violations are found, then system can optionally start remediating the document by redacting/masking the violating content or moving the document to a safe location.

Figure 4:
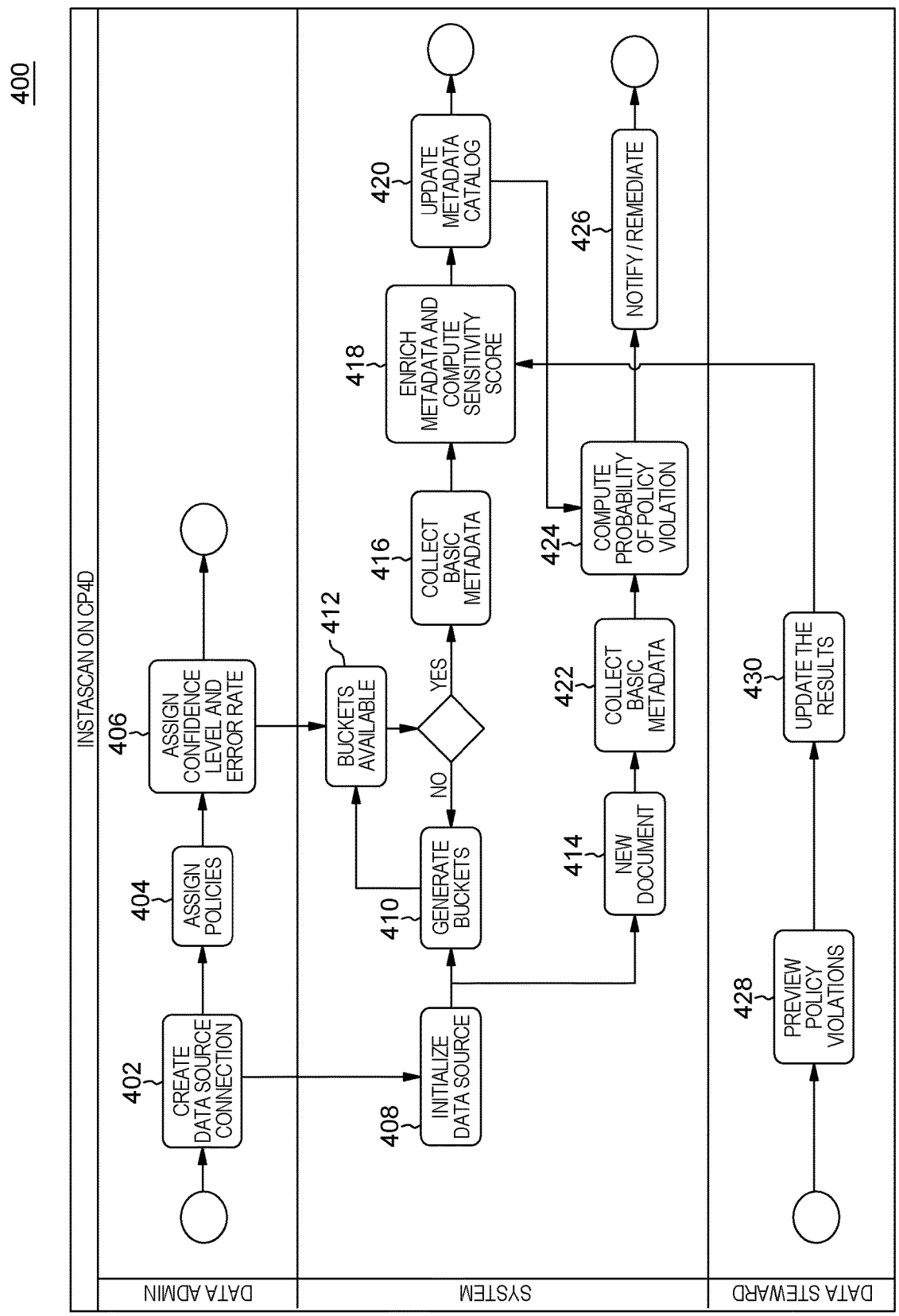
FIG. 4 is a diagram showing information that is helpful in understanding embodiments of the present invention.

Diagram 400 of FIG. 4 shows a diagram of the high level implementation steps of the method described above. It is important to emphasize that the ability to predict the policy violation within an unstructured document has immense benefit to users of enterprise products.

Diagram 400 shows operations that are performed by: a data administrator, a system, and a data steward. The operations performed by the data administrator include: create a data source connection 402, assign policies 404, and assign a confidence level and error rate 406.

Operations performed by the system include: initialize data source 408, generate buckets 410, determine whether buckets are available 412, generate/receive new documents 414, collect basic metadata 416, enrich metadata and compute sensitivity score 418, update metadata catalog 420, collect basic metadata 422, compute probability of policy violation(s) 424, and notify user/remediation operation 426.

Operations performed by the data steward include: review policy violations 428 and update the results 430.

Some embodiments of the present invention provide a method, with the method including the following operations (not necessarily in the following order): (i) defining one or more sensitive data placement policies; (ii) assigning one or more of the above policies to a data source; (iii) defining a required confidence level and margin of error; (iv) computing the number of samples required to achieve the above confidence level and margin of error; (v) connecting to the data source and collecting documents until the required sample size is reached; (vi) collecting the basic metadata for each document in the above sample set; (vii) downloading the documents in the above set and computing the enriched metadata, with the enriched metadata including list of policy violations (if any) and data classes found; (viii) compute a sensitivity score using the enriched metadata; (ix) create a prediction model using the basic metadata and sensitivity score; (x) for any document not included in the sample above, or any new document added to the data source, retrieve the basic metadata and use the above model to predict if the document contains any policy violations and or sensitivity score; and (xi) use the predicted policy violations/sensitivity score above to take further actions on the document.

Typically, the ultimate goal is to achieve compliance with 100% confidence and 0% margin of error. However, this is not practically feasible in the case of large data sources with millions of documents. Consequently the next target is to achieve the compliance with the highest confidence level (for example 99.995%) and the lowest error rate (0.001). This stated goal is not necessarily an easy task because of the following facts: (i) the amount of unstructured data an organization already has. IDC estimates that 80% of the whole data is unstructured in nature; (ii) the rate at which new data is getting generated; (iii) the variety of unstructured documents including emails, office documents, other collaboration and communication, contracts, etc.; and (iv) the accuracy at which these documents can be evaluated for policy violations (in other words, the veracity of the evaluations).

In some embodiments, an approach to increase the level of compliance (that is, having a higher confidence level and lower margin of error) is to focus on areas where there is a higher probability of finding violations and remediating them. These are referred to as "hot spots" of policy violations. The first step in this approach is to identify the hot spots.

Some examples of policy violation hot spots include: (i) emails addressed to a certain person and certain others are copied has 60% violations as opposed to 2% violations in the rest of the organization; (ii) documents created by employees of the Human Resources (HR) department contains 80% more personal sensitive data than the rest of the organization; (iii) out of all documents generated on first day of every month, 72% of the documents have bank account numbers compared to fewer than 10% of the document on the remainder of the days; and (iv) spreadsheets have a 30% greater probability to find a credit card number inside them compared to office documents.

Currently, the challenge is, there no easy way to identify these hot spots. Additionally, these hot spots are specific to the data source. Embodiments of the present invention provide an algorithm that will help users to identify these hot spots and visually represent them so that the data stewards can focus on remediating these hot spots.

Additionally, embodiments of the present invention provide a system and method to identify the hot spots using the results obtained from the existing risk assessment executed on unstructured data sources. The same method can be applied to structured data sources as well in the context of unified governance; however, this is more relevant in the case of unstructured data sources. The method is described in greater detail in this Sub-Section, below.

Some embodiments of the present invention provides for a method, with the method including the following operations (not necessarily in the following order):

(i) create a connection to the data source providing the required credentials. Optionally, a required confidence level and margin of error at which this data source need to be analysed can be specified. If the confidence level and margin of error is not provided, then default values such as a 99.5% confidence level and 1% margin of error will be assumed;

(ii) assign a required sensitive data placement policies to the data sources. This is a prerequisite for running analysis;

(iii) connect to the data source and initialize basic details such as total number of documents, total volume, time line (time stamp of first and last document), etc.;

(iv) initialize the set of random buckets of time lines that are required for true random sampling. The width of the buckets will be varied so that each bucket will provide a similar number of documents;

(v) perform a metadata crawl (used to collect the basic metadata), which includes:

(a) compute the sample size for which metadata is to be collected. Ideally, metadata should be collected for the whole corpus of documents, but that is not practical when the data source is large. Therefore, it is necessary to collect the metadata only for what is required to achieve the required statistical confidence level and error rate. In some embodiments, data stewards can specify these limits while creating the connection to the data source (referenced above). Additionally, this sample size can be computed with a standard formula from the confidence level and error rate, and (b) collect the metadata for random documents until we reach the above sample size;

(vi) perform a metadata enrichment (to collect the enriched metadata), which includes:

(a) select a subset of the samples collected (from above), (b) for each document: get the content of the document, extract the text, run the text and content through a deep analysis engine to identify a potential policy violation, add a first set of words of the document to the metadata (while excluding stop-words), add the policy violations to the metadata, add the data classes found in the document to the metadata, and compute the sensitivity score and add this score to the metadata, and (c) compute the confidence level and error rate. If the confidence level and error rate is below the specified and/or expected level, then the above process must be repeated until the confidence level and error rate is above the specified and/or expected level;

(vii) compute the confidence level and error rate with the sample size; and (viii) for each attribute in the metadata:

(a) if the attribute is a continuous variable (such as a creation time stamp, file size, etc.), then compute buckets where violations are greater, and select top set of T buckets, (b) If the attribute is discrete (such as owner of a file, a department, etc.), then create discrete sets of buckets where there are more violations than the average in the data source, and select top T buckets again, (c) compute the union of the above two sets of buckets from above (with the union represented as "U"), (d) compute the union from operation (viii)(c) until the size of the union U is larger than the threshold value. Additionally, for the union U combining any two attributes, three attributes and/or any additional attributes therein, operations (viii)(a) and (viii)(b) should be repeated, (e) Sort it as two tuples (that is, the combination of metadata attributes and the percentage of violations that combination has created) with percentage of violations as the sort key, and (f) run the sorted list of tuples.

It is important to note that embodiments of the present invention use standard machine learning algorithms such as k-means clustering for identifying top buckets for a given attribute, (described above in connection with operations (viii)(a) and (viii)(b)). Alternatively, embodiments of the present invention create attribute specific algorithms to identify the top buckets.

Figure 5:
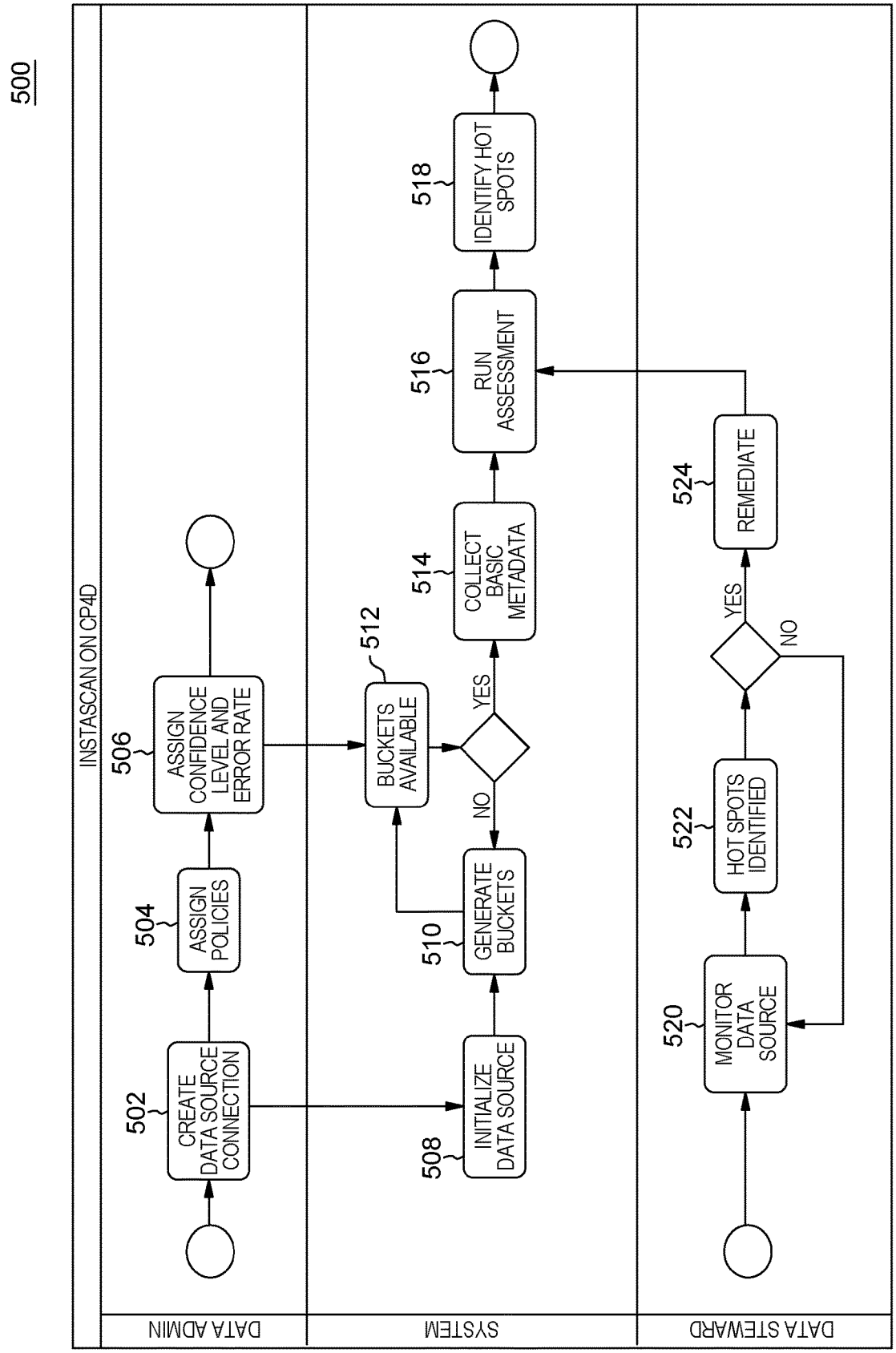
FIG. 5 is a second diagram showing information that is helpful in understanding embodiments of the present invention.

Diagram 500 of FIG. 5 shows a high level flow for the method mentioned above. Diagram 500 includes operations that are performed by a data administrator, a system, and a data steward. The operations performed by the data administrator include: creating a data source connection 502, assign policies 504, and assigning a confidence level and error rate 506.

The operations performed by the system include: initialize the data source 508, generate buckets 510, determine whether buckets are available 512, collect basic metadata 514, run assessment 516, and identify hot spots 518. The operations performed by the data steward include: monitor the data source 520, determine whether hot spots are identified 522, and perform remediation actions 524.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Bucket: The term "bucket" in the context of this document refers to a set of documents retrieved from a data source. In this document, a data source typically contains millions of documents that are to be analyzed. Examples of data sources include email servers, content management server, etc. In some instances, a bucket of 100 documents out of these millions of documents to be analyzed are collected.

What is claimed is:

1. A computer-implemented method (CIM) comprising:
   receiving a plurality of documents, with the plurality of documents including substantive content data and metadata;
   initializing a plurality of random buckets to perform a random sampling operation on the received plurality of documents;

computing a metadata sample size from the plurality of initialized random buckets, with the metadata sample size being a number of documents for which metadata is to be collected based, at least in part, upon a predetermined required confidence level and required error rate;

collecting basic metadata from a sample of the plurality of documents until a number of documents in the sample equals the computed metadata sample size;

selecting a subset of the sample of the plurality of documents;

obtaining substantive content data of documents in the selected subset;

running the obtained substantive content data through an analysis engine, and for each given document in the selected subset; identify one or more policy violations by running a deep analysis on substantive content data of the given document, and identify data classes;

adding the one or more policy violations and the data classes to enriched metadata of the given document;

computing, using the enriched metadata of the given document, a sensitivity score of the given document, the sensitivity score being a linear combination of the one or more policy violations and one or more weights respectively associated with the one or more policy violations;

creating, using the sensitivity score and the basic metadata as a feature vector, a prediction model for computing a probability of a policy violation within a document;

receiving a new document and collecting basic metadata from the new document;

using the prediction model and the collected basic metadata for the new document, and without using substantive content data of the new document, computing a probability of a policy violation within the new document; and based on the computed probability, remediating the new document by redacting or masking content in the new document, the content being associated with the policy violation.

2. The CIM of claim 1, wherein the running the obtained substantive content data through the analysis engine further includes:

extracting text data from the given document in the selected subset, the text data being included in the substantive content data of the given document in the selected subset; and responsive to the extraction of the text data, running a deep analysis on the text data to identify a policy violation.

3. The CIM of claim 2, wherein the running the obtained substantive content data through the analysis engine further includes:

identifying a policy violation from the deep analysis on the text data; and responsive to the identification of the policy violation, adding the identified policy violation to the enriched metadata of the given document.

4. The CIM of claim 3, wherein the running the obtained substantive content data through the analysis engine further includes:

running the deep analysis on the text data to identify a set of data classes for the given document;

identifying the set of data classes for the given document; and adding the identified set of data classes to the enriched metadata of the given document.

5. The CIM of claim 1, further comprising:

responsive to the computation of the sensitivity score, adding the sensitivity score to the enriched metadata of the given document.

6. The CIM of claim 1, further comprising:

determining that (i) an area within a data source is likely to include more policy violations compared to other areas within the data source or (ii) a document type is likely to include more policy violations compared to one or more other document types within the data source; and determining that a first document of the plurality of documents has a policy violation, based, at least in part, upon basic metadata of the first document indicating that (i) the first document is in the area within the data source determined to be likely to include more policy violations compared to the other areas within the data source or (ii) the first document is of a type that matches the document type determined to be likely to include more policy violations compared to the one or more other document types within the data source.

7. A computer program product (CPP) comprising:

a computer readable storage medium; and computer code stored on the computer readable storage medium, with the computer code including instructions and data for causing a processor(s) set to perform operations including the following:

receiving a plurality of documents, with the plurality of documents including substantive content data and metadata, initializing a plurality of random buckets to perform a random sampling operation on the received plurality of documents;

computing a metadata sample size from the plurality of initialized random buckets, with the metadata sample size being a number of documents for which metadata is to be collected based, at least in part, upon a predetermined required confidence level and required error rate, collecting basic metadata from a sample of the plurality of documents until a number of documents in the sample equals the computed metadata sample size, selecting a subset of the sample of the plurality of documents:

obtaining substantive content data of documents in the selected subset;

running the obtained substantive content data through an analysis engine, and for each given document in the selected subset; identify one or more policy violations by running a deep analysis on substantive content data of the given document, and identify data classes;

adding the one or more policy violations and the data classes to enriched metadata of the given document;

computing, using the enriched metadata of the given document, a sensitivity score of the given document, the sensitivity score being a linear combination of the one or more policy violations and one or more weights respectively associated with the one or more policy violations;

creating, using the sensitivity score and the basic metadata as a feature vector, a prediction model for computing a probability of a policy violation within a document;

receiving a new document and collecting basic metadata from the new document;

using the prediction model and the collected basic metadata for the new document, and without using substantive content data of the new document, computing a probability of a policy violation within the new document; and based on the computed probability, remediating the new document by redacting or masking content in the new document, the content being associated with the policy violation.

8. The CPP of claim 7, wherein the running the obtained substantive content data through the analysis engine further includes:

extracting text data from the given document in the selected subset, the text data being included in the substantive content data of the given document in the selected subset; and responsive to the extraction of the text data, running a deep analysis on the text data to identify a policy violation.

9. The CPP of claim 8, wherein the running the obtained substantive content data through the analysis engine further includes:

identifying a policy violation from the deep analysis on the text data; and responsive to the identification of the policy violation, adding the identified policy violation to the enriched metadata of the given document.

10. The CPP of claim 9, wherein the running the obtained substantive content data through the analysis engine further includes:

running the deep analysis on the text data to identify a set of data classes for the given document;

identifying the set of data classes for the given document; and adding the identified set of data classes to the enriched metadata of the given document.

11. The CPP of claim 7, further comprising:

responsive to the computation of the sensitivity score, adding the sensitivity score to the enriched metadata of the given document.

12. The CPP of claim 7, further comprising:

determining that (i) an area within a data source is likely to include more policy violations compared to other areas within the data source or (ii) a document type is likely to include more policy violations compared to one or more other document types within the data source; and determining that a first document of the plurality of documents has a policy violation, based, at least in part, upon basic metadata of the first document indicating that (i) the first document is in the area within the data source determined to be likely to include more policy violations compared to the other areas within the data source or (ii) the first document is of a type that matches the document type determined to be likely to include more policy violations compared to the one or more other document types within the data source.

13. A computer system (CS) comprising:

a processor(s) set;

a machine readable storage device; and computer code stored on the machine readable storage device, with the computer code including instructions and data for causing the processor(s) set to perform operations including the following:

receiving a plurality of documents, with the plurality of documents including substantive content data and metadata, initializing a plurality of random buckets to perform a random sampling operation on the received plurality of documents;

computing a metadata sample size from the plurality of initialized random buckets, with the metadata sample size being a number of documents for which metadata is to be collected based, at least in part, upon a predetermined required confidence level and required error rate, collecting basic metadata from a sample of the plurality of documents until a number of documents in the sample equals the computed metadata sample size, selecting a subset of the sample of the plurality of documents;

obtaining substantive content data of documents in the selected subset;

running the obtained substantive content data through an analysis engine, and for each given document in the selected subset; identify one or more policy violations by running a deep analysis on substantive content data of the given document, and identify data classes;

adding the one or more policy violations and the d ta classes to enriched metadata of the given document;

computing, using the enriched metadata of the given document, a sensitivity score of the given document, the sensitivity score being a linear combination of the one or more policy violations and one or more weights respectively associated with the one or more policy violations;

creating, using the sensitivity score and the basic metadata as a feature vector, a prediction model for computing a probability of a policy violation within a document;

receiving a new document and collecting basic metadata from the new document;

using the prediction model and the collected basic metadata for the new document, and without using substantive content data of the new document, computing a probability of a policy violation within the new document; and based on the computed probability, remediating the new document by redacting of masking content in the new document, the content being associated with the policy violation.

14. The CS of claim 13, wherein the running the obtained substantive content data through the analysis engine further includes:

extracting text data from the given document in the selected subset, the text data being included in the substantive content data of the given document in the selected subset; and responsive to the extraction of the text data, running a deep analysis on the text data to identify a policy violation.

15. The CS of claim 14, wherein the running the obtained substantive content data through the analysis engine further includes:

identifying a policy violation from the deep analysis on the text data; and responsive to the identification of the policy violation, adding the identified policy violation to the enriched metadata of the given document.

16. The CS of claim 15, wherein the running the obtained substantive content data through the analysis engine further includes:

running the deep analysis on the text data to identify a set of data classes for the given document;

identifying the set of data classes for the given document; and adding the identified set of data classes to the enriched metadata of the given document.

17. The CS of claim 13, further comprising:

responsive to the computation of the sensitivity score, adding the sensitivity score to the enriched metadata of the given document.

18. The CS of claim 13, further comprising:

determining that (i) an area within a data source is likely to include more policy violations compared to other areas within the data source or (ii) a document type is likely to include more policy violations compared to one or more other document types within the data source; and determining that a first document of the plurality of documents has a policy violation, based, at least in part, upon basic metadata of the first document indicating that (i) the first document is in the area within the data source determined to be likely to include more policy violations compared to the other areas within the data source or (ii) the first document is of a type that matches the document type determined to be likely to include more policy violations compared to the one or more other document types within the data source.

* * * * *